United States Patent
Aoyama et al.

(10) Patent No.: US 12,266,481 B2
(45) Date of Patent: Apr. 1, 2025

(54) ELECTROLYTIC CAPACITOR INCLUDING ELECTROLYTIC SOLUTION HAVING HIGH ELECTRICAL CONDUCTIVITY AND METHOD FOR PRODUCING SAME

(71) Applicant: Panasonic Intellectual Property Management Co., Ltd., Osaka (JP)

(72) Inventors: Tatsuji Aoyama, Kyoto (JP); Yuji Otsuka, Yamaguchi (JP); Tomoyuki Tashiro, Yamaguchi (JP); Kenta Chashiro, Osaka (JP); Yuichiro Tsubaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 17/813,940

(22) Filed: Jul. 21, 2022

(65) Prior Publication Data

US 2022/0359127 A1 Nov. 10, 2022

Related U.S. Application Data

(63) Continuation of application No. PCT/JP2021/005824, filed on Feb. 17, 2021.

(30) Foreign Application Priority Data

Feb. 19, 2020 (JP) ................. 2020-025781

(51) Int. Cl.
*H01G 9/00* (2006.01)
*H01G 9/025* (2006.01)
*H01G 9/035* (2006.01)

(52) U.S. Cl.
CPC .......... *H01G 9/0036* (2013.01); *H01G 9/025* (2013.01); *H01G 9/035* (2013.01)

(58) Field of Classification Search
None
See application file for complete search history.

(56) References Cited

U.S. PATENT DOCUMENTS 6,307,735 B1 10/2001 Saito et al.
2016/0172117 A1 6/2016 Kubo et al.
(Continued)

FOREIGN PATENT DOCUMENTS

| JP | 11-283874 | 10/1999 |
| JP | 2015-207573 | 11/2015 |
| JP | 2020-005003 | 1/2020 |

OTHER PUBLICATIONS

International Search Report of PCT application No. PCT/JP2021/005824 dated May 18, 2021.

*Primary Examiner* — Scott B Geyer
(74) *Attorney, Agent, or Firm* — Rimon P.C.

(57) ABSTRACT

A method for producing an electrolytic capacitor includes: preparing an anode foil, a cathode foil, and a fibrous structure, the anode foil having a porous portion including a dielectric layer; preparing a conductive polymer-containing liquid, the conductive polymer-containing liquid containing a conductive polymer component and a first solvent; forming a separator by removing at least a part of the first solvent after applying the conductive polymer-containing liquid to the fibrous structure; forming a capacitor element from the anode foil, the separator, and the cathode foil; and impregnating the capacitor element with an electrolytic solution. An electrical conductivity of the electrolytic solution at 30° C. is 3.0 mS/cm or more.

14 Claims, 4 Drawing Sheets

(56) References Cited

U.S. PATENT DOCUMENTS

| | | | |
|---|---|---|---|
| 2017/0092427 A1* | 3/2017 | Aoyama | H01G 9/02 |
| 2017/0092428 A1* | 3/2017 | Aoyama | H01G 9/02 |
| 2017/0125170 A1* | 5/2017 | Ashino | H01G 9/145 |
| 2018/0082798 A1* | 3/2018 | Tsuda | H01G 11/52 |
| 2018/0204689 A1* | 7/2018 | Brambilla | H01G 11/70 |
| 2018/0323015 A1* | 11/2018 | Andoralov | H01G 11/26 |
| 2019/0067676 A1* | 2/2019 | Nagamitsu | H01G 11/50 |
| 2019/0148084 A1* | 5/2019 | Hagiya | H01G 11/60 361/502 |
| 2020/0251286 A1* | 8/2020 | Dobai | H01G 9/048 |

* cited by examiner

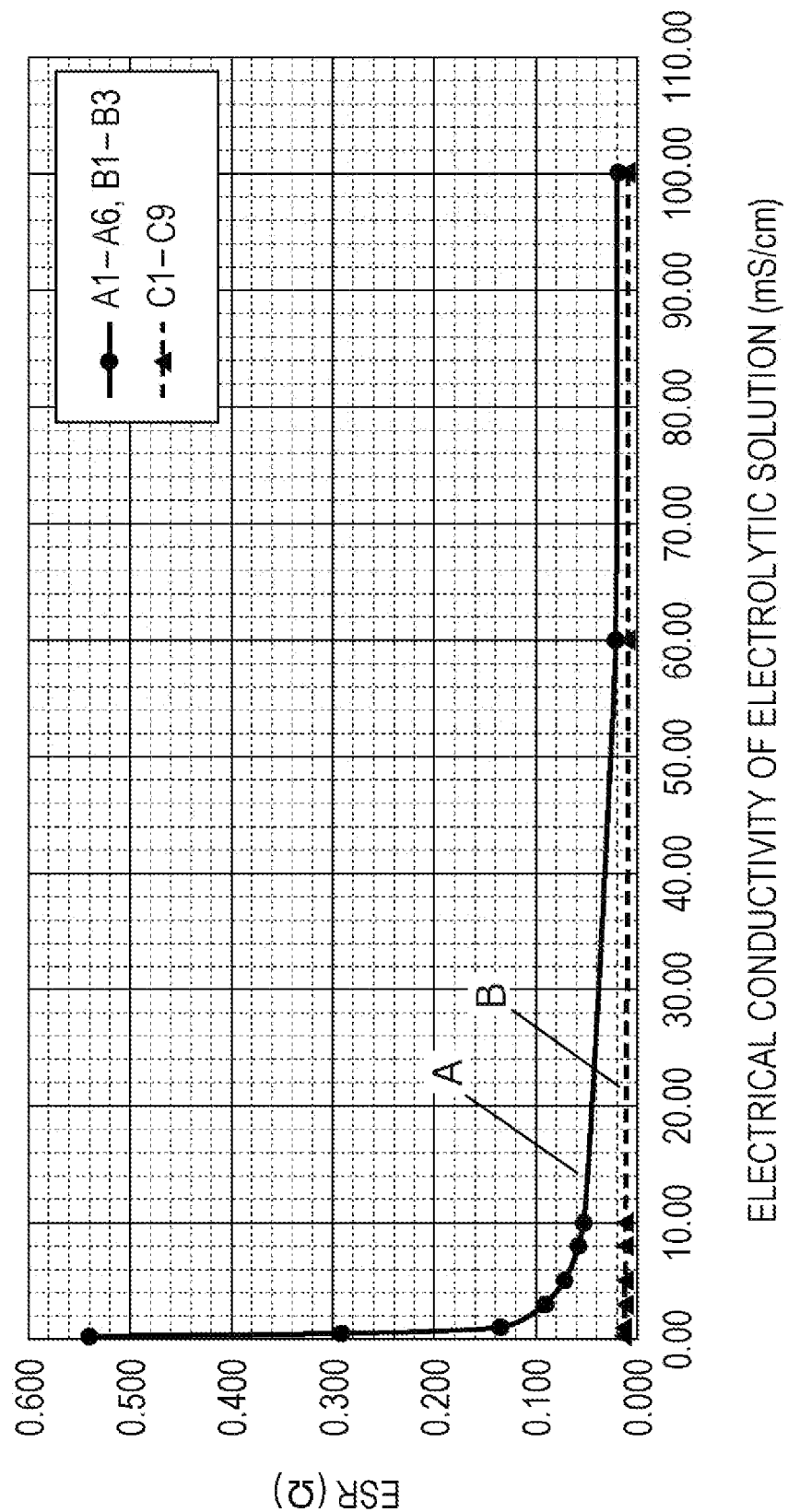

ELECTROLYTIC CAPACITOR INCLUDING ELECTROLYTIC SOLUTION HAVING HIGH ELECTRICAL CONDUCTIVITY AND METHOD FOR PRODUCING SAME

BACKGROUND

1. Technical Field

The present disclosure relates to an electrolytic capacitor including a conductive polymer and an electrolytic solution as a cathode material, and a method for producing the electrolytic capacitor.

2. Description of the Related Art

Capacitors used in electronic devices are required to have a large capacitance and a small equivalent series resistance (ESR) in a high frequency region. Promising candidates as large capacitance and low ESR capacitors are electrolytic capacitors using, as a solid electrolyte, a conductive polymer such as polypyrrole, polythiophene, polyfuran, or polyaniline.

The electrolytic capacitor is conventionally produced by impregnating a capacitor element with a dispersion liquid containing a conductive polymer. This is because the conductive polymer can be attached by the same method as the electrolytic solution without requiring a large facility.

In order to enhance the effect of reducing the ESR, it is most effective to include the conductive polymer in the separator. However, when the capacitor element is impregnated with the dispersion liquid containing the conductive polymer, a large amount of the conductive polymer adheres to elements other than the separator. Thus, an amount of the conductive polymer used for attaching the conductive polymer to the separator increases and the production cost increases. That is, the conductive polymer cannot be efficiently attached to a necessary portion of the capacitor element, which is not efficient in terms of cost.

Thus, Unexamined Japanese Patent Publication No. 2015-207573 proposes a method for producing an electrolytic capacitor using a separator to which a conductive polymer is attached in advance.

SUMMARY

A first aspect of the present disclosure relates to a method for producing an electrolytic capacitor. The method includes: a step of preparing an anode foil, a cathode foil, and a fibrous structure, the anode foil having a porous portion including a dielectric layer; a step of preparing a conductive polymer-containing liquid, the conductive polymer-containing liquid containing a conductive polymer component and a first solvent; a step of forming a separator by removing at least a part of the first solvent after applying the conductive polymer-containing liquid to the fibrous structure; a step of forming a capacitor element from the anode foil, the separator, and the cathode foil; and a step of impregnating the capacitor element with an electrolytic solution. An electrical conductivity of the electrolytic solution at 30° C. is 3.0 mS/cm or more.

A second aspect of the present disclosure relates to an electrolytic capacitor produced by the production method.

According to the present disclosure, in an electrolytic capacitor including a conductive polymer and an electrolytic solution as a cathode material, an ESR of the electrolytic capacitor can be lowered while reducing the amount of the conductive polymer used for the production.

BRIEF DESCRIPTION OF THE DRAWINGS

FIG. 4 is a graph showing a relationship between ESR of the electrolytic capacitor and an electrical conductivity of an electrolytic solution.

DETAILED DESCRIPTIONS OF EMBODIMENTS

Figure 1:
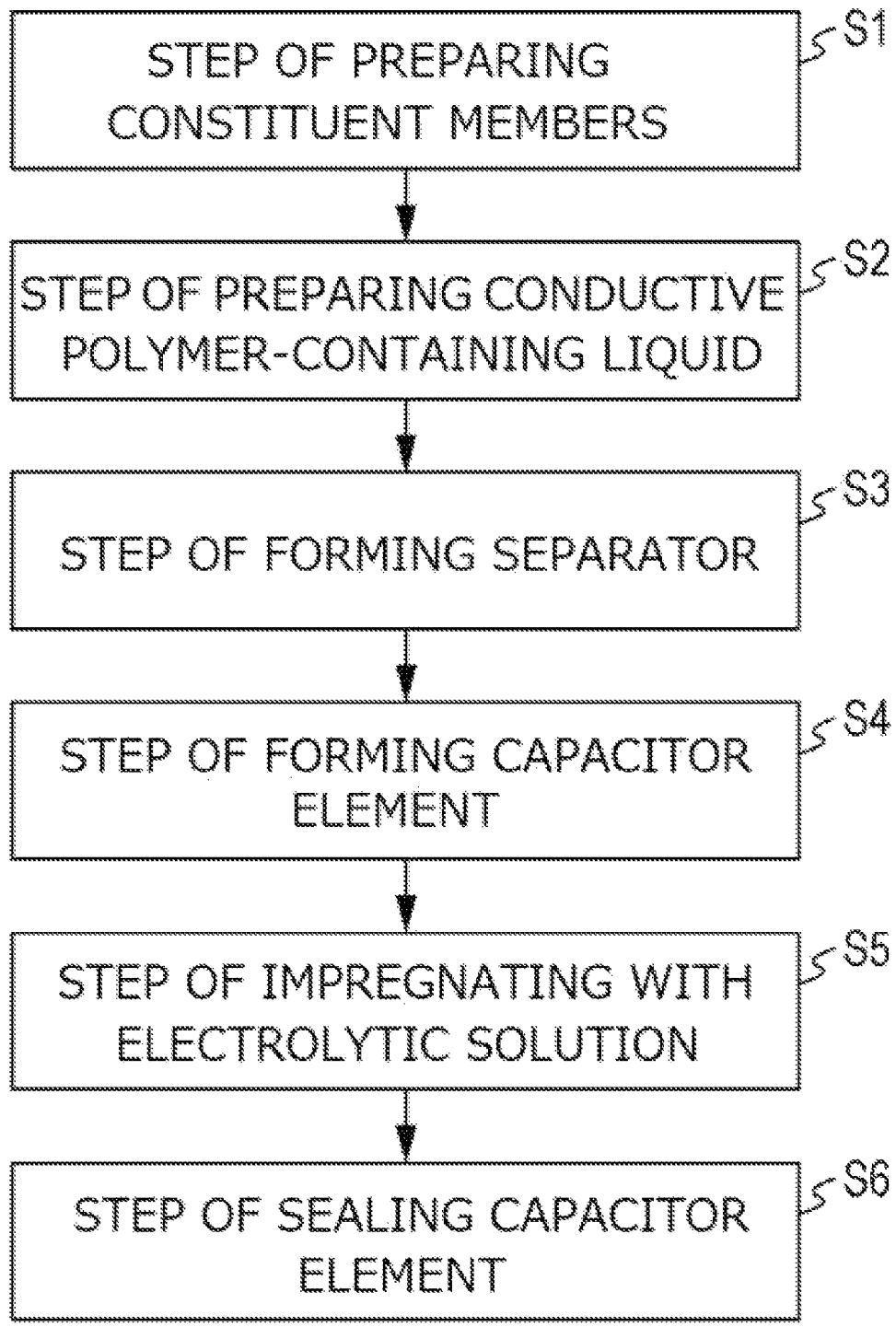
FIG. 1 is a flowchart showing an example of a production method according to an exemplary embodiment of the present disclosure.

When a conductive polymer is attached only to a separator as in a method for producing an electrolytic capacitor described in Unexamined Japanese Patent Publication No. 2015-207573, a large part of a dielectric layer included in an anode foil is not covered with the conductive polymer. Hence, conductivity in a porous portion of the anode foil becomes insufficient, and thus a sufficient current cannot be drawn. As a result, it becomes difficult to achieve low ESR.

A method for producing an electrolytic capacitor according to the present disclosure includes (i) a step of preparing an anode foil, a cathode foil, and a fibrous structure, the anode foil having a porous portion including a dielectric layer, (ii) a step of preparing a conductive polymer-containing liquid, the conductive polymer-containing liquid containing a conductive polymer component and a first solvent, (iii) a step of forming a separator by removing at least a part of the first solvent after applying the conductive polymer-containing liquid to the fibrous structure, (iv) a step of forming a capacitor element from the anode foil, the separator, and the cathode foil, and (v) a step of impregnating the capacitor element with an electrolytic solution. Meanwhile, electrical conductivity of the electrolytic solution at 30° C. is 3.0 mS/cm or more.

Hereinafter, an electrolytic capacitor including the conductive polymer and the electrolytic solution is also referred to as a "hybrid electrolytic capacitor".

In the above production method, the step of including the conductive polymer in the capacitor element corresponds to the step (iii), which includes applying the conductive polymer-containing liquid to the fibrous structure. Thereafter, the step (iv) of producing the capacitor element from the anode foil, the separator, and the cathode foil is performed. After the capacitor element is produced, a process of further including the conductive polymer component in the capacitor element is not required. For example, it is not necessary to impregnate the capacitor element with the conductive polymer-containing liquid, and usually such a step is not performed.

When the step of impregnating the capacitor element with the conductive polymer-containing liquid is not performed, adhesion of a large amount of the conductive polymer to elements other than the separator is prevented. As a result, the conductive polymer component can be efficiently attached to the separator that is expected to have the largest effect of reducing ESR by the conductive polymer component. An efficient use of the conductive polymer can reduce the amount of the conductive polymer used for the production, thereby reducing the production cost.

In the above production method, since a step of actively impregnating the anode foil with the conductive polymer component is not performed, the conductive polymer component cannot be expected to enter a deep part of the porous portion in the anode foil. Although a part of the conductive polymer component can move from the separator to the surface layer portion of the porous portion, many portions of the dielectric layer deeper than the surface layer portion are not covered with the conductive polymer component. In such a structure, when an electrolytic solution having conductivity to an extent generally used in a hybrid electrolytic capacitor is used, it is difficult to draw a sufficient current from the dielectric layer in the porous portion, and as a result, an increase in ESR is caused.

In the hybrid electrolytic capacitor, the influence of the conductivity of the electrolytic solution on the ESR is small. Thus, it is usually considered that an approach of improving the conductivity of the electrolytic solution in order to reduce the ESR is not effective.

When the electrolytic solution in which an electrical conductivity at 30° C. is 3.0 mS/cm or more is used, the ESR is remarkably reduced in the hybrid electrolytic capacitor in which the dielectric layer is hardly covered with the conductive polymer component in the deep part of the porous portion. Hence, a sufficient current can be drawn from the porous portion.

A function required for the electrolytic solution used in the hybrid electrolytic capacitor is a function of repairing the dielectric layer. The function of repairing the dielectric layer can be achieved even with an electrolytic solution having almost no conductivity. In a general hybrid electrolytic capacitor, the influence of the electrical conductivity of the electrolytic solution on the ESR is very small. From the above circumstances, the electrical conductivity of the electrolytic solution used for the hybrid electrolytic capacitor is conventionally set to be much lower than 3.0 mS/cm. That is, it can be said that an electrical conductivity of 3.0 mS/cm or more is a considerably high electrical conductivity for the electrolytic solution of the hybrid electrolytic capacitor.

In a general production process of the hybrid electrolytic capacitor, after assembling a capacitor element including an anode foil, a step of impregnating the capacitor element with a conductive polymer component is performed. In this case, the conductive polymer component enters the deep part of the porous portion in the anode foil, and the dielectric layer formed in a pit of the deep part can be covered with the conductive polymer component. Although such a structure has a desirable aspect from the viewpoint of current drawing, in a region covered with the conductive polymer component, repairing of the dielectric layer by the electrolytic solution is less likely to proceed. Thus, a leakage current (LC) tends to increase. The production method according to the present disclosure is a method capable of producing an electrolytic capacitor without allowing the conductive polymer component to enter the deep part of the porous portion in the anode foil, and thus is very effective in obtaining an electrolytic capacitor with a reduced LC.

The present disclosure also includes an electrolytic capacitor (hereinafter, also referred to as electrolytic capacitor X) produced by the above production method. In particular, since electrolytic capacitor X is an electrolytic capacitor having good ESR and a reduced LC, electrolytic capacitor X has advantage over a conventional aluminum electrolytic capacitor which does not contain a conductive polymer component and contains an electrolytic solution.

Thus, electrolytic capacitor X is particularly useful in applications where conventional aluminum electrolytic capacitors are used.

The capacitor element generally includes an anode lead connected to the anode foil and a cathode lead connected to the cathode foil. The capacitor element is configured by, for example, winding the anode foil having the anode lead and the cathode foil having the cathode lead with a separator interposed therebetween. Since the anode lead and the cathode lead need to be drawn out to the outside of a case in the electrolytic capacitor, each of the anode lead and the cathode lead has a region protruding from the separator. When the step of impregnating the capacitor element with the conductive polymer-containing liquid is performed, the conductive polymer component also adheres to the region of the anode lead and the cathode lead protruding from the separator. The conductive polymer component also adheres to an end surface of the anode foil and an end surface of the cathode foil.

In contrast, when the step of impregnating the capacitor element with the conductive polymer-containing liquid is not performed, the chance that the conductive polymer component adheres to the region of the anode lead and the cathode lead protruding from the separator is significantly reduced. Similarly, the chance that the conductive polymer component adheres to the end surface of the anode foil and the end surface of the cathode foil is significantly reduced. For example, after the conductive polymer component peeled off from the separator floats in the electrolytic solution, the conductive polymer component may adhere to the region of the lead protruding from the separator or the end surface of the anode foil or the cathode foil.

However, an amount of the conductive polymer component flows out from such a separator is small. Thus, whether or not the conductive polymer component is derived from the separator can be determined from an amount of the conductive polymer component adhering to the region of the lead protruding from the separator, the end surface of the anode foil or the cathode foil, a state (for example, a distribution state) of the conductive polymer component, and the like.

In other words, in the case of electrolytic capacitor X, the region of the anode lead and the cathode lead protruding from the separator may not be substantially covered with the conductive polymer component. Similarly, the end surface of the anode foil and the end surface of the cathode foil included in the capacitor element may not be substantially covered with the conductive polymer component. At least from such a viewpoint, it is possible to determine whether or not the electrolytic capacitor is electrolytic capacitor X obtained by the production method according to the present disclosure.

In consideration of variations in the size of the capacitor element, the amount of the conductive polymer component used, the production process, and the like, there are variations in the adhesion amount to the region of the lead protruding from the separator, the end surface of the anode foil or the cathode foil, the state of the conductive polymer component, and the like. Thus, it is difficult to clearly define, by parameters, the adhesion amount of the conductive polymer component to the region and the state of the conductive polymer component. Meanwhile, a ratio of an area of the region covered with the conductive polymer component on at least one of the end surface of the anode foil and the end surface of the cathode foil included in electrolytic capacitor X can be, for example, 1.0% or less. The ratio of the area of the region covered with the conductive polymer component can be calculated from image data by, for example, analyzing the end surface with an X-ray microanalyzer (XMA) to acquire image data of element mapping.

Mass Mp of the conductive polymer component supported by the anode foil of electrolytic capacitor X is usually greatly different from mass Ms of the conductive polymer component supported by the separator. For example, it is preferable that Ms>Mp is satisfied, and, in addition, Ms>10.0×Mp is satisfied. Usually, a space volume of the porous portion of the anode foil is greater than the space volume of the separator. Thus, when the step of impregnating the capacitor element with the conductive polymer-containing liquid is performed as in the conventional case, an amount of the conductive polymer supported by the anode foil is greater than an amount supported by the separator. When the ESR is sufficiently reduced in a state where Ms>Mp is satisfied, it can be said that an effective utilization factor of the conductive polymer is increased.

Here, Ms and Mp can be determined from mass changes before and after combustion by burning the separator and the anode foil in a dry state after decomposing the electrolytic capacitor to pick up the separator and the anode foil. For example, Ms and Mp are calculated by analyzing the separator and the anode foil by thermogravimetric analysis (TGA method). In the TGA method, for example, a thermal change, a decrease amount of a sample, and the like are measured when the temperature of the sample is increased at a constant rate. The mass of the conductive polymer component attached to the separator and the anode foil can be calculated based on the measured value. The conductive polymer component may be separated and extracted from the separator by a method such as solvent extraction, and the mass of the conductive polymer component may be measured.

When the thickness of the porous portion of the anode foil is T, an amount M1 of the conductive polymer component present in a region from a surface of the porous portion to depth position D1, which is located at a depth of T/10 from the surface, and an amount M2 of the conductive polymer component present in a region from depth position D1 to depth position D2, which is located at a depth of 2×T/10 from the surface, preferably satisfy M1>M2. More preferably, amounts M1 and M2 satisfy M1>10.0×M2. Here, M1 and M2 can be calculated from image data by analyzing a cross section of the anode foil in a thickness direction by XMA and acquiring image data of element mapping.

When the thickness of the porous portion is T, the conductive polymer component may be substantially absent in a region deeper than depth position D3, which is located a depth of T/2 from the surface of the porous portion. Presence or absence of the conductive polymer component in the region deeper than depth D3 can be confirmed by analyzing the cross section of the anode foil in the thickness direction by XMA.

Method for Producing Electrolytic Capacitor

FIG. 1 is a flowchart showing an example of a method for producing an electrolytic capacitor. Hereinafter, an example of the method for producing an electrolytic capacitor will be described for each step. The production method includes (i) a step of preparing an anode foil, a cathode foil, and a fibrous structure, the anode foil having a porous portion including a dielectric layer, (ii) a step of preparing a conductive polymer-containing liquid, the conductive polymer-containing liquid containing a conductive polymer component and a first solvent, (iii) a step of forming a separator by removing at least a part of the first solvent after applying the conductive polymer-containing liquid to the fibrous structure, (iv) a step of forming a capacitor element from the anode foil, the separator, and the cathode foil, and (v) a step of impregnating the capacitor element with an electrolytic solution. Meanwhile, electrical conductivity of the electrolytic solution at 30° C. is 3.0 mS/cm or more.

(i) Step of Preparing Anode Foil, Cathode Foil, and Fibrous Structure (S1)

(i-i) Anode Foil

As a raw material of the anode foil, for example, a metal foil containing a valve metal is prepared. The metal foil used as the anode foil has a porous portion. The porous portion may be formed, for example, by roughening a surface of the metal foil. By the roughening, a plurality of irregularities is formed on the surface of the metal foil. For example, the surface of the metal foil can be roughened by etching the metal foil. The etching may be performed by, for example, a direct current electrolysis method or an alternating current electrolysis method.

Next, the dielectric layer is formed on the surface of the metal foil having the porous portion. Although a method for forming the dielectric layer is not particularly limited, the metal foil having the porous portion may be subjected to an anodizing treatment. In the anodizing treatment, for example, the metal foil is immersed in an anodizing liquid such as an ammonium adipate solution. The metal foil may be subjected to a heat treatment, or a voltage may be applied to the metal foil. As a result, an anodization film is formed as the dielectric layer. In this case, the dielectric layer can contain an oxide of the valve metal. Note that the dielectric layer is not limited thereto, and only has to be any one that functions as a dielectric material.

As the valve metal, at least one of titanium, tantalum, aluminum, niobium, and the like can be used. The anode foil may contain the valve metal in a form such as an alloy containing the valve metal or a compound containing the valve metal.

(i-ii) Cathode Foil

The cathode foil is not particularly limited as long as functioning as a cathode. The cathode foil may be metal foil. The type of the metal is not particularly limited, and the metal may be the valve metal or an alloy containing the valve metal as with the anode foil.

For example, as a raw material of the cathode foil, a metal foil containing the valve metal is prepared. A surface of the cathode foil may be roughened as necessary. A dielectric layer (anodization film) may also be formed on a surface of a metal foil used as the cathode foil.

A conductive covering layer may be formed on the surface of the cathode foil by sputtering or vapor deposition. This makes it possible to reduce contact resistance between the cathode foil and the conductive polymer component contained in the separator, which is more advantageous in reducing the ESR. As a material for forming the conductive covering layer, carbon, a metal (for example, titanium or nickel) having a lower ionization tendency than a valve metal (for example, aluminum) constituting the cathode foil, or the like is preferable. Among the materials, titanium is preferably contained as a material for forming the conductive covering layer. A surface of titanium easily passivates (an oxide film is easily formed), titanium is stable, and acid resistance of the cathode foil can be improved even when the electrolytic solution contains a large amount of an acid component.

A covering layer of an oxide film may be formed on the surface of the cathode foil by anodizing. When the electrolytic solution contains a large amount of an acid component, it is preferable to form the covering layer of the oxide film at an anodizing voltage of 5 V or more in order to improve the acid resistance. This makes it easy to improve the acid resistance even when the electrolytic solution contains a large amount of acid component.

After a conductive covering layer is formed on the surface of the cathode foil, a part of the conductive covering layer may be subjected to anodization to further form a covering layer of an oxide film. Examples of the metal contained in the conductive covering layer include nickel, titanium, tantalum, and zirconium. Among these metals, titanium having a high dielectric constant of oxide is preferable from the viewpoint of increasing a composite capacitance of the anode foil and the cathode foil. At this time, in order to improve the acid resistance, it is preferable to form an oxide film on the surface of the conductive covering layer at an anodizing voltage of 2 V or more, more preferably 4 V or more.

After the covering layer of the oxide film is formed on the surface of the cathode foil, a conductive covering layer may be further formed on the covering layer of the oxide film. At this time, when the electrolytic solution contains a large amount of an acid component, it is preferable to form an oxide film on the surface of the cathode foil at an anodizing voltage of 5 V or more. In this case, titanium is preferable as the valve metal contained in the conductive covering layer.

The conductive covering layer can be formed by attaching a conductive inorganic material to the surface of the cathode foil. At this time, a gas phase method may be used. Examples of the gas phase method include chemical vapor deposition, vacuum vapor deposition, sputtering, and ion plating. The gas phase method is suitable for forming a conductive covering layer including a deposited film of an inorganic material. For example, a conductive covering layer containing a metal nitride can be formed by the gas phase method under a nitrogen gas atmosphere. As the inorganic material for forming the deposited film, conductive carbon such as amorphous carbon, titanium, and the like are preferable. As a raw material of the conductive carbon, graphite, hard carbon, soft carbon, carbon black, or the like may be used.

The conductive covering layer may also be formed by coating the surface of the cathode foil with a paste or a slurry containing a conductive inorganic material and a binder to form a coating film, and drying the coating film. At this time, the coating film may be heat-treated to remove the binder.

Thickness of the covering layer may range, for example, from 5 nm to 200 nm, inclusive, and may range from 10 nm to 200 nm, inclusive. The thickness of the covering layer can be measured by, for example, X-ray photoelectron spectroscopy (XPS method).

(i-iii) Fibrous Structure

The fibrous structure is a raw material of the separator. The fibrous structure is not particularly limited as long as being porous. Examples of the fibrous structure include woven fabrics, knitted fabrics, and nonwoven fabrics containing fibers. As the fibrous structure, cellulose that is low in cost and retains the electrolytic solution well can be used.

On the other hand, when cellulose comes into contact with the conductive polymer-containing liquid, wrinkles are likely to be generated at the moment, and cellulose is likely to be shrunk by drying, and thus, a fibrous structure containing 50% by mass or more of synthetic fibers may be used. Alternatively, a fibrous structure containing a paper strength enhancer together with cellulose fibers may be used. By suppressing wrinkles of the separator, the conductive polymer-containing liquid uniformly adheres, and the thickness of the separator to be obtained becomes uniform. Thus, in the electrolytic capacitor, variations in withstand voltage and inter-electrode resistance are easily suppressed.

In the fibrous structure (hereinafter, referred to as the first fibrous structure) containing 50% by mass or more of synthetic fibers, the content proportion of the synthetic fibers in the first fibrous structure may be 70% by mass or more. The kind of the synthetic fiber is not limited in particular. From the viewpoint of strength and resistance to swelling by water, at least one selected from the group consisting of nylon fibers, aramid fibers, acrylic fibers, and polyester fibers may be contained as the synthetic fibers.

The first fibrous structure may contain cellulose. In consideration of retention of the electrolytic solution, the content proportion of cellulose in the first fibrous structure may be 10% by mass or more. The content proportion of cellulose in the first fibrous structure may be less than 50% by mass, 30% by mass or less, or 20% by mass or less.

In the fibrous structure (hereinafter, referred to as the second fibrous structure) containing the paper strength enhancer together with cellulose fibers, the type of paper strength enhancer is not particularly limited, a wet paper strength enhancer and/or a dry paper strength enhancer may be used. These paper strength enhancers may be used alone or in combination. Examples of the wet paper strength enhancer include at least one selected from the group consisting of urea formaldehyde resin, melamine formaldehyde resin, polyamide polyamine epichlorohydrin, and polyvinyl amine. Examples of the dry paper strength enhancer include at least one selected from the group consisting of polyacrylamide, polyvinyl alcohol, starch, and carboxymethyl cellulose.

The paper strength enhancer may be added to the raw material (for example, slurry containing cellulose fibers) of the second fibrous structure, or may be applied to the second fibrous structure by spraying or the like.

When the paper strength enhancer is added, the second fibrous structure may contain cellulose at a content proportion of 40% by mass or more, or may contain cellulose at a content proportion of 70% by mass or more. The second fibrous structure may further contain synthetic fibers. The content proportion of the synthetic fibers in the second fibrous structure may range, for example, from 10% by mass to 60% by mass, inclusive.

The density of each fibrous structure may be, for example, 0.2 g/cm$^3$ or more and less than 0.45 g/cm$^3$. Even in such a fibrous structure having a low density, when the fibrous structure contains 50% by mass or more of synthetic fibers or contains a paper strength enhancer together with cellulose fibers, swelling of the fibrous structure due to a conductive polymer component-containing liquid is easily suppressed. The density of the fibrous structure (including the paper strength enhancer) may range, for example, from 0.25 g/cm$^3$ to 0.40 g/cm$^3$, inclusive.

The thickness of each fibrous structure is not particularly limited. The thickness of each fibrous structure may range, for example, from 20 μm to 100 μm inclusive, and preferably from 30 μm to 60 μm inclusive. This makes it easy to suppress short circuit of the electrolytic capacitor to be obtained and to further improve the effect of reducing the ESR.

(ii) Step of Preparing Conductive Polymer-Containing Liquid (S2)

The conductive polymer-containing liquid contains the first solvent and a conductive polymer component. The conductive polymer-containing liquid can be obtained by, for example, a method for dispersing the particles of the conductive polymer component in the first solvent or a method for polymerizing a precursor monomer of the conductive polymer component in the first solvent and generating particles of the conductive polymer component in the first solvent.

The content proportion of the conductive polymer component in the conductive polymer-containing liquid is not particularly limited. The content proportion of the conductive polymer component in the conductive polymer-containing liquid may range from 1% by mass to 15% by mass, inclusive. When the content proportion of the conductive polymer component is within this range, it is easy to attach a sufficient amount of the conductive polymer component to the fibrous structure. The content proportion of the conductive polymer component in the conductive polymer-containing liquid may be 3% by mass or more in terms of easily increasing the amount of the conductive polymer component adhering to the fibrous structure.

The viscosity of the conductive polymer-containing liquid is not particularly limited. The viscosity of the conductive polymer-containing liquid measured at room temperature (20° C.) using a vibration type viscometer (for example, VM-100A available from SEKONIC CORPORATION) may be 10 mPa·s or more. The viscosity of the conductive polymer-containing liquid measured under the above conditions may be 40 mPa·s or more or 50 mPa·s or more, and may be 200 mPa·s or less. The conductive polymer-containing liquid having a viscosity in such a range is particularly suitable for a coating method.

The conductive polymer component includes a conductive polymer. Examples of the conductive polymer include polypyrrole, polythiophene, polyfuran, polyaniline, polyacetylene, polyphenylene, polyphenylene vinylene, polyacene, and polythiophene vinylene. These may be used alone, may be used in combination of two or more types, or may be a copolymer of two or more types of monomers.

In the present description, polypyrrole, polythiophene, polyfuran, polyaniline, and the like mean polymers having, as a basic skeleton, polypyrrole, polythiophene, polyfuran, polyaniline, and the like, respectively. Thus, polypyrrole, polythiophene, polyfuran, polyaniline, and the like each can also include its derivative. For example, polythiophene includes poly (3,4-ethylenedioxythiophene) and the like.

The conductive polymer component may further include a dopant. The dopant may be a polyanion. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. A single one or two or more kinds in combination of these polymer dopants may be used. Alternatively, these may be a polymer of a single monomer or a copolymer of two or more types of monomers. Especially, a polyanion derived from polystyrenesulfonic acid is preferable.

A weight average molecular weight of the polyanion contained in the conductive polymer component is not particularly limited. The weight average molecular weight of a first polyanion may range, for example, from 1000 to 200000, inclusive. The conductive polymer component containing such a polyanion is easily and uniformly dispersed in the first solvent, and easily adheres to the separator. The weight average molecular weight of the polyanion may range from 1000 to 70000, inclusive. Even when a large amount of such a polyanion is contained, an excessive increase in viscosity of the conductive polymer-containing liquid is suppressed, and the amount adhering to the separator is likely to increase.

The conductive polymer component is dispersed in the first solvent, for example, in the form of particles. The particles of the conductive polymer component have an average particle diameter that is not particularly limited, and that can be appropriately adjusted by, for example, polymerization conditions and dispersion conditions. For example, the average particle diameter of the particles of the conductive polymer component may range from 0.01 μm to 0.5 μm, inclusive. Here, the mean particle diameter is a median diameter in a volume particle size distribution measured by a particle diameter measuring device using dynamic light scattering.

The first solvent may contain water or a nonaqueous solvent. The nonaqueous solvent is a generic term for liquids excluding water, and examples thereof include organic solvents and ionic liquids. A proportion of the water in the first solvent may be 50% by mass or more, 70% by mass or more, or 90% by mass or more. Examples of the nonaqueous solvent to be used together with water include a polar solvent (a protic solvent and/or an aprotic solvent).

Examples of the protic solvent include alcohols such as methanol, ethanol, propanol, butanol, ethylene glycol (EG), propylene glycol, polyethylene glycol (PEG), diethylene glycol monobutyl ether, glycerin, 1-propanol, butanol, polyglycerin, sorbitol, mannitol, and pentaerythritol, and formaldehyde. Examples of the aprotic solvent include: amides such as N-methylacetamide, N,N-dimethylformamide, and N-methyl-2-pyrrolidone; esters such as methyl acetate and γ-butyrolactone (γBL); ketones such as methyl ethyl ketone; ethers such as 1,4-dioxane; sulfur-containing compounds such as dimethylsulfoxide and sulfolane (SL); and carbonate compounds such as propylene carbonate.

When the first solvent contains alcohols (particularly, polyhydric alcohol and sugar alcohols) as described above, an electric conductivity and an impregnation property into the separator are likely to be enhanced. On the other hand, the polyhydric alcohol and the sugar alcohols easily swell cellulose. The first fibrous structure and the second fibrous structure are less likely to swell even in the first solvent containing such alcohols, so that generation of wrinkles is suppressed.

(iii) Step of Forming Separator (S3)

Next, the conductive polymer-containing liquid is applied to the fibrous structure, and then at least a part of the first solvent is removed to form a separator. From the viewpoint of improving the efficiency of the subsequent step of impregnating the capacitor element with the electrolytic solution, a state where the separator contains the first solvent (that is, a state where the separator is wet) may be maintained during a period from the application of the conductive polymer-containing liquid to the fibrous structure to the impregnation of the capacitor element with the electrolytic solution.

By applying the conductive polymer-containing liquid to the fibrous structure as a raw material of the separator before preparing the capacitor element, the conductive polymer component can be selectively contained in the separator, and a large amount of the conductive polymer is prevented from adhering to elements other than the separator. The conductive polymer component mainly adheres to a surface of fibers constituting the fibrous structure.

A method for applying the conductive polymer-containing liquid to the fibrous structure is not particularly limited. The fibrous structure may be impregnated with the conductive polymer-containing liquid, or the conductive polymer-containing liquid may be applied to the fibrous structure by a coating method.

The coating method is a technique of applying a liquid substance to an object using a coater. Examples of the coater include known devices such as a gravure coater, a knife coater, a comma coater, a roll coater, a die coater, and a lip coater.

An amount of the conductive polymer-containing liquid applied to the fibrous structure is not particularly limited. For example, the application amount may be appropriately set so that the conductive polymer component adheres to the fibrous structure in an amount ranging from 0.02 mg/cm$^2$ to 0.2 mg/cm$^2$, inclusive, further from 0.03 mg/cm$^2$ to 0.1 mg/cm$^2$, inclusive.

A coating treatment using the conductive polymer-containing liquid may be performed on one surface or both surfaces of the fibrous structure. The coating treatment using the conductive polymer-containing liquid may be performed a plurality of times on the same surface of the fibrous structure. This makes it possible to increase the amount of the conductive polymer component to be attached. In this case, the coating treatment may be continuously performed a plurality of times, and then a drying treatment may be performed, or the drying treatment may be performed every time the coating treatment is performed once.

When the separator is viewed from a normal direction of a principal surface thereof, 50% or more of an area of the principal surface may be covered with the conductive polymer component, for example. An area coverage ratio by the conductive polymer component in the principal surface of the separator may be 60% or more, and may be preferably 90% or more. The conductive polymer component may be continuously disposed or discontinuously disposed on the surface of the separator. The area coverage ratio is calculated by using the separator cut into a predetermined size used for the electrolytic capacitor. The area coverage ratio may be calculated by binarizing an image obtained by taking a principal surface of a constituent member.

From the viewpoint of mass productivity, the step of forming the separator may be performed for a long fibrous structure. When the coating treatment is performed on both surfaces of the fibrous structure as a long body, first, the coating treatment is performed on one surface, and then the fibrous structure is wound around a roll after the drying treatment. Thereafter, the coating treatment may be performed on the other surface again with the same or another coater while the fibrous structure is unwound from the roll in an inverted manner.

The conductive polymer component may also be attached to constituent members other than the separator of the capacitor element. For example, even when the conductive polymer component is attached to the cathode foil, self-repair performance of the anode foil is not hindered.

The first solvent is removed by, for example, a drying treatment such as heating and drying or drying under reduced pressure. The drying treatment is not particularly limited, and may be appropriately set according to the type of the first solvent, the amount of the application, and the like. At this time, the drying treatment may be performed to such an extent that the first solvent is not completely removed.

In a case where the capacitor element is impregnated with the electrolytic solution in a later step, when the conductive polymer component adheres to the separator together with the first solvent, the electrolytic solution is easily impregnated into a hole of the separator by being induced by the first solvent. As a result, the anode foil and the cathode foil are easily brought into contact with the electrolytic solution, so that improvement in self-repair performance of the anode foil and an increase in electrostatic capacitance can be expected. Further, when the long separator to which the conductive polymer component adheres is wound into a roll, the conductive polymer component is less likely to crack if the first solvent is completely removed from the separator.

The long separator to which the conductive polymer component adheres is cut before or during the step of forming the capacitor element. The same applies to other long constituent members.

(iv) Step of Forming Capacitor Element (S4)

The capacitor element is obtained by stacking or winding the anode foil and the cathode foil such that the separator is interposed between the anode foil and the cathode foil. In the case of the wound capacitor element, an end of the cathode foil located at an outermost layer is fixed with a fastening tape. When the anode foil has a cutting surface, the capacitor element may be further subjected to an anodizing treatment (re-anodizing treatment) in order to form a dielectric layer on such a cutting surface.

(v) Step of Impregnating Capacitor Element with Electrolytic Solution (S5)

Next, the capacitor element is impregnated with an electrolytic solution. A method for the impregnation with the electrolytic solution is not particularly limited. At this time, the capacitor element may be impregnated with the electrolytic solution in a state where the separator contains the first solvent. For example, it is preferable that the first solvent remains at an amount of 10% by mass or less with respect to the amount of the first solvent contained in the conductive polymer-containing liquid immediately after the coating treatment.

The electrical conductivity of the electrolytic solution at 30° C. may be 3.0 mS/cm or more, 5.0 mS/cm or more, or 10 mS/cm or more. Since it is difficult to make the electrical conductivity of the electrolytic solution at 30° C. higher than 100 mS/cm, 100 mS/cm may be considered as the upper limit of the electrical conductivity of the electrolytic solution. The electric conductivity of the electrolytic solution may be measured using a commercially available electrical conductivity meter (for example, EC METER CM-30R available from DKK-TOA CORPORATION) by immersing a container containing the electrolytic solution in a water bath, and keeping the electrolytic solution at 30° C. The electrical conductivity can be measured by immersing a predetermined probe of the electrical conductivity meter in an electrolytic solution.

The electrolytic solution contains a second solvent and a solute. From the viewpoint of achieving the electrical conductivity described above, the electrolytic solution may contain 10% by mass or more, and further 20% by mass or more of a solute. As the solute, a salt of an acid component and a base component that are ionically dissociated in the electrolytic solution is preferable from the viewpoint of a high degree of dissociation. Since most of the conductive polymer component is stable in an acidic electrolytic solution, the acid component may be excessive. Meanwhile, from the viewpoint of enhancing the electrical conductivity of the electrolytic solution, it is most preferable that the electrolytic solution contains 1 equivalent of the base component per equivalent of the acid component, and the electrolytic solution may contain from 0.8 equivalents to 1.2 equivalents, inclusive, of the base component per equivalent of the acid component.

From the above, the pH of the electrolytic solution is preferably 5.0 or more, and may be 7.0 or more. Meanwhile, from the viewpoint of preventing deterioration of the conductive polymer component, the pH of the electrolytic solution is preferably 8.5 or less.

The acid component preferably produces an anion that does not excessively increase the viscosity of the electrolytic solution, and that easily dissociates in the electrolytic solution and easily moves in the second solvent. Examples of such an acid component include aliphatic sulfonic acid having 1 to 30 carbon numbers and aromatic sulfonic acid having 6 to 30 carbon numbers. As the aliphatic sulfonic acid, monovalent saturated aliphatic sulfonic acid (e.g., hexanesulfonic acid) is preferable. As the aromatic sulfonic acid, aromatic sulfonic acid having a hydroxy group or a carboxy group in addition to a sulfo group is preferable, and specifically, oxyaromatic sulfonic acid (e.g., phenol-2-sulfonic acid) and sulfoaromatic carboxylic acid (e.g., p-sulfobenzoic acid, 3-sulfophthalic acid, and 5-sulfosalicylic acid) are preferable.

Examples of other acid components include carboxylic acid. The carboxylic acid preferably contains aromatic carboxylic acid having two or more carboxyl groups (aromatic dicarboxylic acid). Examples of the aromatic carboxylic acid include phthalic acid (ortho form), isophthalic acid (meta form), terephthalic acid (para form), maleic acid, benzoic acid, salicylic acid, trimellitic acid, and pyromellitic acid. In particular, aromatic dicarboxylic acid such as phthalic acid (ortho form) or maleic acid is more preferable. The carboxyl group of the aromatic dicarboxylic acid is stable and is less likely to cause a side reaction to proceed. This causes an effect of stabilizing the conductive polymer component to be exhibited over a long period of time, thereby being advantageous in prolonging the life of the electrolytic capacitor. The carboxylic acid may be aliphatic carboxylic acid such as adipic acid.

The acid component may contain a composite compound of organic acid and inorganic acid in terms of thermal stability. Examples of the composite compound of organic acid and inorganic acid include borodisalicylic acid, borodioxalic acid, and borodiglycolic acid that have high heat resistance.

The acid component may include inorganic acid such as boric acid, phosphoric acid, phosphorous acid, hypophosphorous acid, and phosphonic acid.

The concentration of the acid component in the electrolytic solution may range from 5% by mass to 50% by mass, inclusive, or from 15% by mass to 35% by mass, inclusive.

The base component is expected to have a function of suppressing corrosion of the electrode foil in addition to a function of promoting dissociation of the acid component. The base component is not particularly limited, and examples thereof include ammonia, primary amine, secondary amine, tertiary amine, a quaternary ammonium compound, and an amidinium compound. Examples of each amine include aliphatic amine, aromatic amine, and heterocyclic amine.

The concentration of the base component in the electrolytic solution may range from 5% by mass to 50% by mass, inclusive, or from 10% by mass to 35% by mass, inclusive.

Examples of the second solvent include water, a sulfone compound, a lactone compound, a carbonate compound, and a polyhydric alcohol. Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate (DMC), diethyl carbonate (DEC), ethylmethyl carbonate (EMC), ethylene carbonate (EC), propylene carbonate (PC), and fluoroethylene carbonate (FEC). Examples of the polyhydric alcohol include: glycol compounds such as ethylene glycol (EG), diethylene glycol, triethylene glycol, propylene glycol, and polyethylene glycol (PEG); and glycerin. These compounds may be used alone or in combination of a plurality of types of compound.

Among the above, at least one selected from the group consisting of water and a lactone compound is preferable as the second solvent because the viscosity is low and the solute is easily dissolved (that is, ion dissociation easily occurs). In particular, water can best dissolve solutes. From the viewpoint of suppressing volatilization of the second solvent, water and a polyhydric alcohol (EG, PEG, etc.) may be combined.

The electrolytic solution may contain, for example, 5% by mass or more of water as the first solvent, or may contain 10% by mass or more or 20% by mass or more of water. From the viewpoint of suppressing swelling of the electrolytic capacitor in a high-temperature environment, the content proportion of water in the electrolytic solution may be 70% by mass or less.

The electrolytic solution may contain, for example, 20% by mass or more of a lactone compound as the first solvent, or may contain 30% by mass or more or 50% by mass or more of a lactone compound. 100% of the second solvent may be a lactone compound.

(vi) Step of Sealing Capacitor Element (S6)

The produced capacitor element is housed in, for example, a cylindrical bottomed case. As a material of the bottomed case, metal such as aluminum, stainless steel, copper, iron, or brass, or an alloy thereof can be used. Subsequently, the bottomed case is laterally squeezed at near its opening end to curl the opening end to crimp sealing member, thereby sealing the capacitor element. Finally, a base plate is disposed on a curled portion to complete the electrolytic capacitor. Thereafter, an aging treatment may be performed while a rated voltage is being applied.

Figure 2:
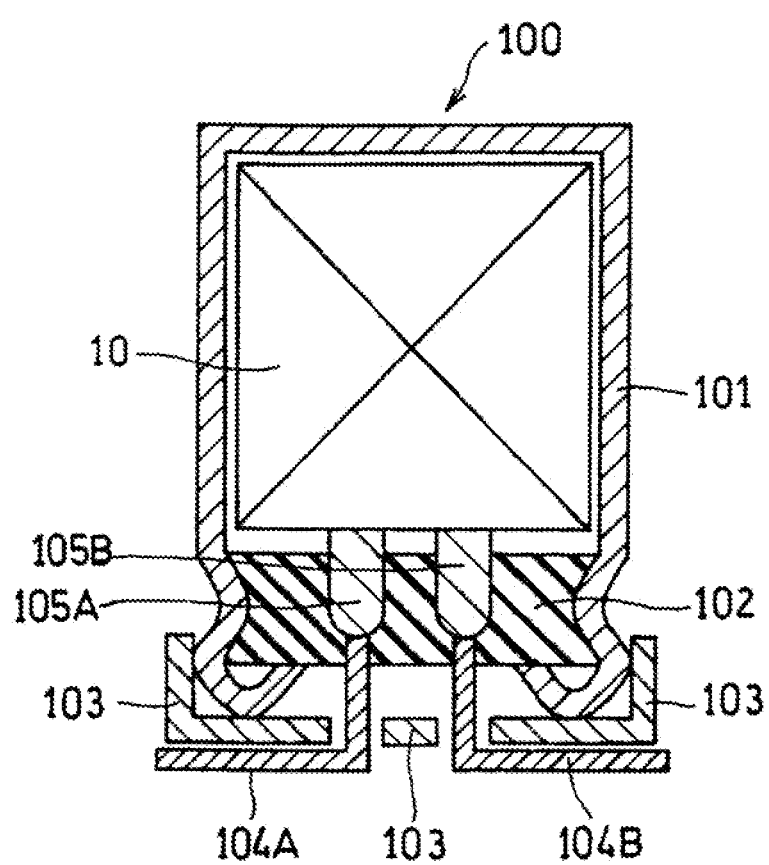
FIG. 2 is a side view schematically illustrating an electrolytic capacitor according to the exemplary embodiment of the present disclosure.
Figure 3:
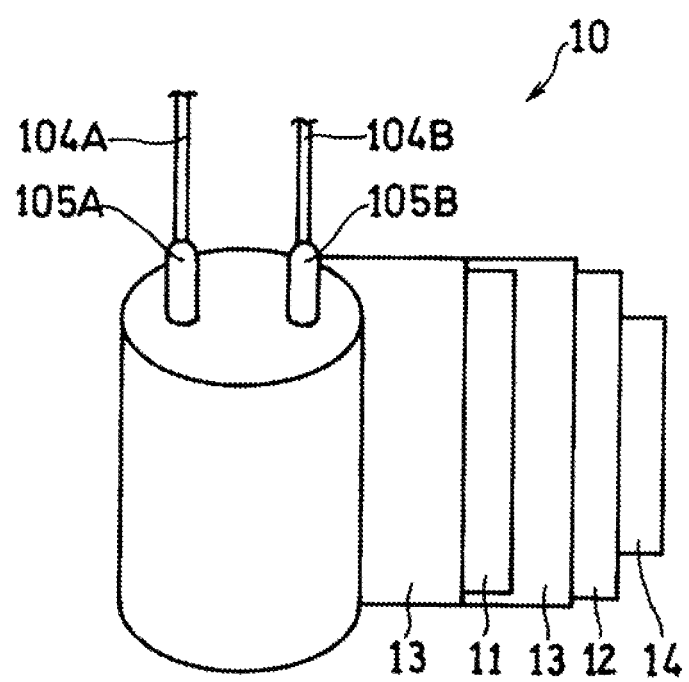
FIG. 3 is an exploded perspective view schematically illustrating a part of a capacitor element according to the exemplary embodiment of the present disclosure.

FIG. 2 is a schematic cross-sectional view illustrating the electrolytic capacitor according to the present disclosure, and FIG. 3 is a schematic view in which a part of the capacitor element of the electrolytic capacitor is developed.

Electrolytic capacitor 100 includes, for example, capacitor element 10, bottomed case 101 that houses capacitor element 10, sealing member 102 that closes an opening of bottomed case 101, seat plate 103 that covers sealing member 102, lead wires 104A, 104B led out from sealing member 102 and penetrating seat plate 103, and lead tabs 105A, 105B connecting the lead wires and the electrodes of capacitor element 10. The vicinity of an opening end of bottomed case 101 is drawn inward, and the opening end is curled to swage sealing member 102.

Capacitor element 10 is, for example, a wound body as illustrated in FIG. 3. The wound body includes anode foil 11 connected to lead tab 105A, cathode foil 12 connected to lead tab 105B, and separator 13. Separator 13 includes a first polymer layer (not illustrated) and a second polymer layer.

Anode foil 11 and cathode foil 12 are wound with separator 13 interposed between the anode foil and the cathode foil. The outermost circumference of the wound body is fixed with winding stop tape 14. Note that FIG. 3 shows a state where a part of the wound body is developed before the outermost circumference of the wound body is stopped.

The electrolytic capacitor may have at least one capacitor element, and may have a plurality of capacitor elements. The number of capacitor elements included in the electrolytic capacitor may be determined in accordance with application.

EXAMPLES

Hereinafter, the present disclosure will be described in more detail based on examples, but the present disclosure is not limited to the examples.

Example 1

An electrolytic capacitor having a rated voltage of 25V was produced in the following manner.

(a) Preparation of Constituent Member

An etching treatment was performed on an aluminum foil having a thickness of 100 μm to roughen a surface of the aluminum foil, thereby forming porous portions having a thickness of 30 μm on both surfaces. The surface of the aluminum foil having the porous portion was subjected to anodizing treatment to form a dielectric layer having a thickness of 40 nm, thereby obtaining an anode foil.

Etching treatment was performed on aluminum foil having a thickness of 50 μm to roughen the surface of the aluminum foil, thereby obtaining cathode foil. The roughened surface of the aluminum foil was subjected to anodizing treatment to form a dielectric layer having a thickness of 10 nm.

A nonwoven fabric having a thickness of 50 μm was prepared as a raw material of a separator. The nonwoven fabric is composed of cellulose and contains polyacrylamide as the paper strength enhancer. A density of the nonwoven fabric was 0.35 g/cm$^3$.

(b) Preparation of Conductive Polymer-Containing Liquid

A mixed solution was prepared by dissolving 3,4-ethylenedioxythiophene and polystyrenesulfonic acid (PSS, weight average molecular weight of 100000) in ion-exchanged water (first solvent). While the mixed solution was stirred, iron (III) sulfate (oxidant) was added to the mixed solution to cause a polymerization reaction. Subsequently, the reaction solution was dialyzed to remove an unreacted monomer and oxidant, so that a conductive polymer-containing liquid containing polyethylene dioxythiophene (PEDOT/PSS, conductive polymer component) doped with about 5% by mass of PSS (dopant) was obtained.

A concentration of the conductive polymer component in the conductive polymer-containing liquid was 2% by mass.

The conductive polymer-containing liquid had a viscosity of 40 mPa·s measured under conditions of room temperature (20° C.) using a vibration type viscometer (VM-100A available from SEKONIC CORPORATION).

(c) Formation of Separator

The conductive polymer-containing liquid was applied to both surfaces of the fibrous structure using a gravure coater. Thereafter, the drying treatment was performed to obtain a separator. The mass of the conductive polymer component per unit area of the separator was 0.02 mg/cm$^2$. The area coverage ratio of one principal surface of the separator by the conductive polymer component was 98%.

(d) Formation of Capacitor Element

The anode foil, the cathode foil, and the separator were each cut into a predetermined size.

An anode lead tab and a cathode lead tab were connected to the anode foil and the cathode foil, respectively, and the anode foil and the cathode foil were wound with a separator interposed between the anode foil and the cathode foil while the lead tabs were rolled in the anode foil, the cathode foil, and the separator. Ends of the lead tabs protruding from the wound body were connected to an anode lead wire and a cathode lead wire, respectively. The obtained wound body was subjected to anodization again to form a dielectric layer on the end surface of the anode foil. An end of an outer surface of the wound body was fixed with a fastening tape to obtain a capacitor element.

(e) Impregnation with Electrolytic Solution

As the second solvent, a mixed solvent containing water and ethylene glycol (EG) in a mass ratio of 15:85 was prepared. Ortho-phthalic acid (divalent) as an acid component and triethylamine as a base component were dissolved in the second solvent to prepare an electrolytic solution having a total concentration of solutes of 10% by mass. An equivalent ratio of ortho-phthalic acid to triethylamine was 1.0. The pH of the electrolytic solution was 6.2, and the electrical conductivity at 30° C. was 3 mS/cm.

The capacitor element was immersed in the electrolytic solution for 5 minutes in a reduced-pressure atmosphere (40 kPa) to impregnate the capacitor element with the electrolytic solution. When the capacitor element was impregnated with the electrolytic solution, the separator in the capacitor element was wet with water contained in the conductive polymer-containing liquid.

(f) Sealing of Capacitor Element

The capacitor element that had been impregnated with the electrolytic solution was sealed to complete electrolytic capacitor (A1) illustrated in FIG. 2. Then, aging was performed at 95° C. for 90 minutes while rated voltage is applied.

Evaluation

Electrolytic capacitor A1 was measured for ESR at a measurement temperature of 20° C. after aging. Evaluation results are shown as relative values to the electrostatic capacitance and ESR of electrolytic capacitor B1 prepared in Comparative Example 1.

Comparative Examples 1 to 3, Examples 2 to 6

The electrical conductivity at 30° C. was changed by changing the concentration of the solute to be dissolved in the electrolytic solution. However, since the equivalent ratio of ortho-phthalic acid to triethylamine was maintained at 1.0, the pH of the electrolytic solution was within a range of 5.0 to 8.0.

Reference Examples 1 to 9

A capacitor element was assembled in the same manner as in Example 1 except that the conductive polymer-containing liquid was not applied to the fibrous structure. Thereafter, the capacitor element was immersed in the following separately prepared conductive polymer-containing liquid (hereinafter, second conductive polymer-containing liquid) for 5 minutes in a reduced-pressure atmosphere (40 kPa) to impregnate the capacitor element with the second conductive polymer-containing liquid. Thereafter, the capacitor element was subjected to the drying treatment.

The capacitor element after drying was impregnated with the electrolytic solution and sealed in the same manner as in Comparative Examples 1 to 3 and Examples 1 to 6 to complete electrolytic capacitors (C1 to C9), and the electrolytic capacitors were evaluated in the same manner as described above.

Preparation of Second Conductive Polymer-Containing Liquid

A mixed solution was prepared by dissolving 3,4-ethylenedioxythiophene and polystyrenesulfonic acid (PSS, weight-average molecular weight of 100000) in ion-exchanged water. While the mixed solution was stirred, iron (III) sulfate (oxidant) was added to the mixed solution to cause a polymerization reaction. Subsequently, the reaction solution was dialyzed to remove an unreacted monomer and oxidant, so that a second conductive polymer-containing liquid containing polyethylene dioxythiophene (PEDOT/PSS) doped with about 5% by mass of PSS (dopant) was obtained.

A concentration of the conductive polymer component in the second conductive polymer-containing liquid was 1.5% by mass. The second conductive polymer-containing liquid had a viscosity of 30 mPa·s measured under conditions of room temperature (20° C.) using a vibration type viscometer (VM-100A available from SEKONIC CORPORATION).

TABLE 1

| Electrolytic solution | Electrolytic capacitor | | | |
|---|---|---|---|---|
| Electrical conductivity (mS/cm) | Example Comparative Example | Reference Example | ESR (mΩ) B1 to B3 A1 to A6 | C1 to C9 |
| 0.25 | B1 | C1 | 0.540 | 0.0121 |
| 0.50 | B2 | C2 | 0.293 | 0.0122 |
| 1.00 | B3 | C3 | 0.136 | 0.0120 |
| 3.00 | A1 | C4 | 0.091 | 0.0123 |
| 5.00 | A2 | C5 | 0.072 | 0.0119 |
| 8.00 | A3 | C6 | 0.058 | 0.0120 |
| 10.0 | A4 | C7 | 0.053 | 0.0122 |
| 60.0 | A5 | C8 | 0.024 | 0.0120 |
| 100 | A6 | C9 | 0.022 | 0.0121 |

The results of Table 1 are illustrated in FIG. 4. Graph A shows a relationship between the ESR of electrolytic capacitors B1 to B3 and A1 to A6 and the electrical conductivity of the electrolytic solution. Graph B shows a relationship between the ESR of electrolytic capacitors C1 to C9 and the electrical conductivity of the electrolytic solution. It can be understood that the electrical conductivity of the electrolytic solution is very important when the separator is impregnated with the conductive polymer-containing liquid without impregnating the capacitor element with the conductive polymer-containing liquid. That is, it can be understood that when the electrical conductivity of the electrolytic solution is less than 3 mS/cm, the ESR rapidly increases, whereas when the electrical conductivity is 3 mS/cm or more, the ESR remarkably decreases and converges to a sufficiently small ESR. On the other hand, in the case of electrolytic capacitors C1 to C9, it is found that the ESR does not depend on the electrical conductivity of the electrolytic solution.

Comparative Examples 4 to 6 and Examples 7 to 12

Next, using the second solvent of 100% γ-butyrolactone, the total concentration of solutes in the electrolytic solution was controlled to prepare an electrolytic solution having an electrical conductivity at 30° C. as shown in Table 1. An equivalent ratio of orthophthalic acid to triethylamine was 1.0. Electrolytic capacitors (B4 to B6 and A7 to A12) were completed in the same manner as in Comparative Examples 1 to 3 and Examples 1 to 6 except that this electrolytic solution was used, and the electrolytic capacitors were evaluated in the same manner as described above. The results are shown in Table 2.

TABLE 2

| Electrolytic solution | Electrolytic capacitor | | | |
|---|---|---|---|---|
| Electrical conductivity (mS/cm) | Example Comparative Example | Reference Example | ESR (mΩ) A7 to A12 | C1 to C9 |
| 0.25 | B4 | C1 | 0.570 | 0.0121 |
| 0.50 | B5 | C2 | 0.321 | 0.0122 |
| 1.00 | B6 | C3 | 0.145 | 0.0120 |
| 3.00 | A7 | C4 | 0.101 | 0.0123 |
| 5.00 | A8 | C5 | 0.082 | 0.0119 |
| 8.00 | A9 | C6 | 0.061 | 0.0120 |
| 10.0 | A10 | C7 | 0.055 | 0.0122 |

It can be understood from Table 2 that the electrical conductivity and the ESR of the electrolytic solution show the same correspondence relationship regardless of the type of the solvent of the electrolytic solution.

The electrolytic capacitors of Examples 1 to 6 were disassembled, and the region of the anode lead and the cathode lead protruding from the separator was confirmed. As a result, adhesion of the conductive polymer component was hardly observed. When the capacitor element was disassembled, and the end surface of the anode foil and the end surface of the cathode foil were confirmed, adhesion of the conductive polymer component was hardly observed. On the other hand, when the electrolytic capacitors of Reference Examples 4 to 9 were disassembled, and the region of the anode lead and the cathode lead protruding from the separator was confirmed, a film of the conductive polymer component was formed. When the capacitor element was disassembled, and the end surface of the anode foil and the end surface of the cathode foil were confirmed, a film of the conductive polymer component was formed on almost the entire end surface.

The present disclosure has advantage over conventional aluminum electrolytic capacitors, for example, and is useful in applications where conventional aluminum electrolytic capacitors have been used.

What is claimed is:

1. A method for producing an electrolytic capacitor, the method comprising:
    preparing an anode foil, a cathode foil, and a fibrous structure, the anode foil having a porous portion including a dielectric layer;
    preparing a conductive polymer-containing liquid, the conductive polymer-containing liquid containing a conductive polymer component and a first solvent;
    forming a separator by removing at least a part of the first solvent after applying the conductive polymer-containing liquid to the fibrous structure;
    forming a capacitor element from the anode foil, the separator, and the cathode foil; and
    impregnating the capacitor element with an electrolytic solution, wherein:
    the electrolytic solution contains a solute and a second solvent,
    the solute includes an acid component and a base component,
    the acid component includes at least one selected from the group consisting of an aliphatic sulfonic acid having 1 to 30 carbon numbers, an aromatic sulfonic acid having 6 to 30 carbon numbers, an aromatic carboxylic acid, and an aliphatic carboxylic acid,
    the base component includes at least one selected from the group consisting of ammonia, a primary amine, a secondary amine, a tertiary amine, a quaternary ammonium compound, and an amidinium compound,
    the electrolytic solution contains the solute at a concentration of 10% by mass or more,
    the second solvent contains water, and
    an electrical conductivity of the electrolytic solution at 30° C. is 3.0 mS/cm or more and 100 mS/cm or less.

2. The method according to claim 1, wherein the electrolytic solution contains the water as the first solvent at a content proportion of 5% by mass or more.

3. The method according to claim 1, wherein a pH of the electrolytic solution is 5 or more.

4. The method according to claim 1, wherein in the impregnating of the capacitor element with the electrolytic solution, the capacitor element is impregnated with the electrolytic solution in a state where the separator contains the first solvent.

5. The method according to claim 1, wherein the cathode foil has an anodization film.

6. The method according to claim 1, wherein the acid component includes at least one selected from the group consisting of phthalic acid (ortho form), isophthalic acid (meta form), terephthalic acid (para form), maleic acid, benzoic acid, salicylic acid, trimellitic acid, and pyromellitic acid.

7. The method according to claim 1, wherein the electrolytic solution contains from 0.8 equivalents to 1.2 equivalents, inclusive, of the base component per equivalent of the acid component.

8. A method for producing an electrolytic capacitor, the method comprising:
    preparing an anode foil, a cathode foil, and a fibrous structure, the anode foil having a porous portion including a dielectric layer;
    preparing a conductive polymer-containing liquid, the conductive polymer-containing liquid containing a conductive polymer component and a first solvent;
    forming a separator by removing at least a part of the first solvent after applying the conductive polymer-containing liquid to the fibrous structure;
    forming a capacitor element from the anode foil, the separator, and the cathode foil; and
    impregnating the capacitor element with an electrolytic solution, wherein:
    the electrolytic solution contains a solute and a second solvent,
    the solute includes an acid component and a base component,
    the acid component includes at least one selected from the group consisting of an aliphatic sulfonic acid having 1 to 30 carbon numbers, an aromatic sulfonic acid having 6 to 30 carbon numbers, an aromatic carboxylic acid, and an aliphatic carboxylic acid,
    the base component includes at least one selected from the group consisting of ammonia, a primary amine, a secondary amine, a tertiary amine, a quaternary ammonium compound, and an amidinium compound,
    the electrolytic solution contains the solute at a concentration of 10% by mass or more,
    the second solvent contains a lactone compound, and
    an electrical conductivity of the electrolytic solution at 30° C. is 3.0 mS/cm or more and 10 mS/cm or less.

9. The method according to claim 8, wherein the electrolytic solution contains the lactone compound as the first solvent at a content proportion of 20% by mass or more.

10. The method according to claim 8, wherein a pH of the electrolytic solution is 5 or more.

11. The method according to claim 8, wherein in the impregnating of the capacitor element with the electrolytic solution, the capacitor element is impregnated with the electrolytic solution in a state where the separator contains the first solvent.

12. The method according to claim 8, wherein the cathode foil has an anodization film.

13. The method according to claim 8, wherein the acid component includes at least one selected from the group consisting of phthalic acid (ortho form), isophthalic acid (meta form), terephthalic acid (para form), maleic acid, benzoic acid, salicylic acid, trimellitic acid, and pyromellitic acid.

14. The method according to claim 8, wherein the electrolytic solution contains from 0.8 equivalents to 1.2 equivalents, inclusive, of the base component per equivalent of the acid component.

* * * * *